United States Patent
Yao et al.

(10) Patent No.: US 12,316,229 B2
(45) Date of Patent: May 27, 2025

(54) VOLTAGE CONVERSION CIRCUIT, CHARGING APPARATUS, AND ELECTRIC DEVICE

(71) Applicant: CONTEMPORARY AMPEREX TECHNOLOGY (HONG KONG) LIMITED, Hong Kong (CN)

(72) Inventors: Yuan Yao, Ningde (CN); Weichen He, Ningde (CN); Guiying Lin, Ningde (CN); Huaisen Zhang, Ningde (CN); Jinfeng Gao, Ningde (CN); Yu Yan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 205 days.

(21) Appl. No.: 18/187,112

(22) Filed: Mar. 21, 2023

(65) Prior Publication Data

US 2023/0253886 A1     Aug. 10, 2023

Related U.S. Application Data

(63) Continuation of application No. PCT/CN2022/095295, filed on May 26, 2022.

(30) Foreign Application Priority Data

Dec. 29, 2021 (CN) .......................... 202111642182.9

(51) Int. Cl.
*H02M 3/335* (2006.01)
*H02M 3/00* (2006.01)

(52) U.S. Cl.
CPC ........... *H02M 3/3353* (2013.01); *H02M 3/01* (2021.05)

(58) Field of Classification Search
CPC .................................................. H02M 3/3359
See application file for complete search history.

(56) References Cited

U.S. PATENT DOCUMENTS

| | | |
|---|---|---|
| 2018/0294732 A1 | 10/2018 | Ye et al. |
| 2019/0288539 A1 | 9/2019 | Vela Garcia |
| (Continued) | | |

FOREIGN PATENT DOCUMENTS

| | | |
|---|---|---|
| CN | 104009662 A | 8/2014 |
| CN | 110435464 A | 11/2019 |
| (Continued) | | |

OTHER PUBLICATIONS

The European Patent Office (EPO) The Extended European Search Report for Application No. 22757819.2 Nov. 16, 2023 8 Pages.

(Continued)

*Primary Examiner* — Sisay G Tiku
(74) *Attorney, Agent, or Firm* — ANOVA LAW GROUP, PLLC

(57) ABSTRACT

A voltage conversion circuit includes an N-level conversion unit and N−1 DC-DC conversion units. The N-level conversion unit includes N output terminals at different levels. A first input terminal of an $M^{th}$ DC-DC conversion unit is connected to an $M^{th}$ output terminal of the N-level conversion unit, and a second input terminal of the $M^{th}$ DC-DC conversion unit is connected to an $(M+1)^{th}$ output terminal of the N-level conversion unit. An output level of the $M^{th}$ output terminal and an output level of the $(M+1)^{th}$ output terminal are adjacent levels. N and M are positive integers and satisfy $N \geq 3$ and $1 \leq M < N$.

13 Claims, 7 Drawing Sheets

(56) References Cited

U.S. PATENT DOCUMENTS

| | | | | |
|---|---|---|---|---|
| 2022/0200290 A1* | 6/2022 | Zhang | ............... | H02M 1/007 |
| 2023/0046346 A1* | 2/2023 | Zhang | ................ | H02M 7/48 |
| 2023/0125514 A1* | 4/2023 | Qi | ......................... | H02M 7/49 |
| | | | | 363/13 |
| 2023/0147551 A1 | 5/2023 | Chen et al. | | |
| 2023/0163675 A1* | 5/2023 | Zhang | ............... | H02M 7/483 |
| | | | | 307/82 |
| 2023/0223862 A1* | 7/2023 | Takuno | ................ | H02M 1/007 |
| | | | | 307/11 |
| 2024/0356427 A1* | 10/2024 | Liu | .......................... | H02J 3/46 |

FOREIGN PATENT DOCUMENTS

| | | |
|---|---|---|
| CN | 211656021 U | 10/2020 |
| CN | 112436780 A | 3/2021 |
| CN | 115800242 A * | 3/2023 |
| CN | 107888090 B * | 8/2023 ............... H02J 3/01 |
| EP | 3910773 A1 | 11/2021 |
| KR | 20230106129 A * | 7/2023 |

OTHER PUBLICATIONS

The World Intellectual Property Organization (WIPO) International Search Report and Written Opinion for PCT/CN2022/095295 Sep. 14, 2022 11 Pages (including translation).

The Japan Patent Office (JPO) Notification of Reasons for Refusal for Application No. 2022-563102 and Translation Feb. 6, 2024 10 Pages.

Korean Intellectual Property Office (KIPO) Request for the Submission of an Opinion for Application No. 10-2022-7036048 Jan. 31, 2024 14 Pages (including translation).

* cited by examiner

VOLTAGE CONVERSION CIRCUIT, CHARGING APPARATUS, AND ELECTRIC DEVICE

CROSS-REFERENCE TO RELATED APPLICATIONS

This application is a continuation of International Application No. PCT/CN2022/095295, filed on May 26, 2022, which claims priority to Chinese patent application No. 2021116421829, filed on Dec. 29, 2021 and entitled "VOLTAGE CONVERSION CIRCUIT, CHARGING APPARATUS, AND ELECTRIC DEVICE", the entire contents of both of which are incorporated herein by reference.

TECHNICAL FIELD

This application relates to the field of power supply technologies, and in particular, to a voltage conversion circuit, a charging apparatus, and an electric device.

BACKGROUND

With the development of modern electronics and electricity technologies, power converters are widely used in every industrial field.

However, modern society requires a rising power from power converters. Therefore, how to increase output power of power circuits to satisfy high-power application scenarios is a problem that needs to be solved urgently for now.

SUMMARY

This application is intended to provide a voltage conversion circuit, a charging apparatus, and an electric device, so as to implement high-power output and satisfy high-power application scenarios.

According to a first aspect, a technical solution used in an embodiment of this application is to provide a voltage conversion circuit, including an N-level conversion unit and N−1 DC-DC conversion units. The N-level conversion unit provides N output terminals at different levels. A first input terminal of an $M^{th}$ DC-DC conversion unit is connected to an $M^{th}$ output terminal of the N-level conversion unit, a second input terminal of the $M^{th}$ DC-DC conversion unit is connected to the $(M+1)^{th}$ output terminal of the N-level conversion unit, and an output level of the $M^{th}$ output terminal and an output level of the $(M+1)^{th}$ output terminal are adjacent levels, where $N \geq 3$ and $1 \leq M < N$, and $2 \leq P < N$.

In the technical solution in this embodiment of this application, input terminals of M−1 DC-DC conversion units are correspondingly connected to the N level output terminals of the N-level conversion unit. This can increase output power of the voltage conversion circuit, thereby satisfying high-power application scenarios. Furthermore, in the voltage conversion circuit, output levels of the N-level conversion unit can be directly adjusted, so as to adjust input voltages of the DC-DC conversion units and further adjust output voltages or output currents of the DC-DC conversion units. In this way, output voltages or output currents of a plurality of DC-DC conversion units are equal or close to achieve voltage or current equalization effects, thereby simplifying voltage equalization control or current equalization control.

In some embodiments, a first output terminal of the first DC-DC conversion unit is connected to a first node, a first output terminal of the $P^{th}$ DC-DC conversion unit is connected to a second output terminal of the $(P-1)^{th}$ DC-DC conversion unit, and a second output terminal of the $(N-1)^{th}$ DC-DC conversion unit is connected to a second node, where $2 \leq P < N$.

In the technical solution in this embodiment of this application, the input terminals of the M−1 DC-DC conversion units are correspondingly connected to the N level output terminals of the N-level conversion unit 10, and output terminals of the M−1 DC-DC conversion units are connected in series between the first node B1 and the second node B2. This can increase the output power of the voltage conversion circuit, thereby satisfying high-power application scenarios. Furthermore, in the voltage conversion circuit, the output levels of the N-level conversion unit can be directly adjusted, so as to adjust the input voltages of the DC-DC conversion units and further adjust the output voltages of the DC-DC conversion units. In this way, the output voltages of a plurality of DC-DC conversion units are equal or close, to achieve voltage equalization effects, thereby simplifying voltage equalization control.

In some embodiments, when N=3, the voltage conversion circuit includes a first three-level conversion unit, a first DC-DC conversion unit, and a second DC-DC conversion unit. The first three-level conversion unit provides a first output terminal, a second output terminal, and a third output terminal, whose levels decrease sequentially. A first input terminal of the first DC-DC conversion unit is connected to the first output terminal of the first three-level conversion unit, a second input terminal of the first DC-DC conversion unit and a first input terminal of the second DC-DC conversion unit are connected to the second output terminal of the first three-level conversion unit, and a second input terminal of the second DC-DC conversion unit is connected to the third output terminal of the first three-level conversion unit. The first output terminal of the first DC-DC conversion unit is connected to the first node, a second output terminal of the first DC-DC conversion unit is connected to a first output terminal of the second DC-DC conversion unit, and a second output terminal of the second DC-DC conversion unit is connected to the second node.

In the foregoing embodiments of this application, the foregoing connection manner can increase the output power of the voltage conversion circuit and simplify a manner of equalizing voltages of the first DC-DC conversion unit and the second DC-DC conversion unit.

In some embodiments, the first three-level conversion unit is a single-phase I-type three-level conversion unit, a three-phase I-type three-level conversion unit, a single-phase T-type three-level conversion unit, or a three-phase T-type three-level conversion unit. The foregoing embodiments of this application provide a plurality of circuit structures for the three-level conversion unit, improving design flexibility.

In some embodiments, a first output terminal of each of the DC-DC conversion units is connected to a third node, and a second output terminal of each of the DC-DC conversion units is connected to a fourth node.

In the technical solution in this embodiment of this application, the input terminals of the M−1 DC-DC conversion units are correspondingly connected to the N level output terminals of the N-level conversion unit, and output terminals of the M−1 DC-DC conversion units are connected in parallel between the third node and the fourth node. This can increase the output power of the voltage conversion circuit, thereby satisfying high-power application scenarios. Furthermore, in the voltage conversion circuit, the output levels of the N-level conversion unit can be directly adjusted, so as to adjust the input voltages of the DC-DC conversion units and further adjust the output currents of the DC-DC conversion units. In this way, the output currents of a plurality of DC-DC conversion units are equal or close, to achieve current equalization effects, thereby simplifying current equalization control.

In some embodiments, when N=3, the voltage conversion circuit includes a second three-level conversion unit, a third DC-DC conversion unit, and a fourth DC-DC conversion unit. The second three-level conversion unit provides a first output terminal, a second output terminal, and a third output terminal, whose levels decrease sequentially. A first input terminal of the third DC-DC conversion unit is connected to the first output terminal of the second three-level conversion unit, a second input terminal of the third DC-DC conversion unit and a first input terminal of the fourth DC-DC conversion unit are connected to the second output terminal of the second three-level conversion unit, and a second input terminal of the fourth DC-DC conversion unit is connected to the third output terminal of the second three-level conversion unit. A first output terminal of the first DC-DC conversion unit and a first output terminal of the fourth DC-DC conversion unit are connected to the third node, and a second output terminal of the third DC-DC conversion unit and a second output terminal of the fourth DC-DC conversion unit are connected to the fourth node.

In the foregoing embodiments of this application, the foregoing connection manner can help increase the output power of the voltage conversion circuit and simplify a manner of equalizing currents of the third DC-DC conversion unit and the fourth DC-DC conversion unit.

In some embodiments, the second three-level conversion unit is a single-phase I-type three-level conversion unit, a three-phase I-type three-level conversion unit, a single-phase T-type three-level conversion unit, or a three-phase T-type three-level conversion unit. The foregoing embodiments of this application provide a plurality of circuit structures for the three-level conversion unit, improving design flexibility.

In some embodiments, the input terminals of the N-level conversion unit are connected to a single-phase alternating current power supply or a three-phase alternating current power supply. In the foregoing embodiments of this application, the voltage conversion circuit can adapt to different alternating current power supplies, improving adaptability and compatibility of the voltage conversion circuit.

In some embodiments, the DC-DC conversion unit is an LLC circuit, a CLLLC circuit, or a PSFB circuit. The foregoing embodiments of this application provide a plurality of circuit structures for the DC-DC conversion unit, improving design flexibility.

In some embodiments, the voltage conversion circuit further includes a control unit. The control unit is connected to the N-level conversion unit and the N−1 DC-DC conversion units. The control unit is configured to control output levels of the N-level conversion unit, so that a difference between output voltages of the DC-DC conversion units is less than or equal to a first threshold. Alternatively, the control unit is configured to control the output levels of the N-level conversion unit, so that a difference between output currents of the DC-DC conversion units is less than or equal to a second threshold.

In the foregoing embodiments of this application, the output levels of the N-level conversion unit can be controlled, so that the output voltages or the output currents of all the DC-DC conversion units are equal or close, to implement the purpose of voltage equalization or current equalization. In such voltage equalization and current equalization manner, frequencies, phase shift angles, or duty cycles of the DC-DC conversion units do not need to be adjusted. This can simplify control and improve operating stability of the circuit.

In some embodiments, the control unit is configured to: obtain an output voltage or output current of each of the DC-DC conversion units; and control the output levels of the N-level conversion unit based on the output voltages or the output currents of the DC-DC conversion units.

In the foregoing embodiments of this application, the output levels of the N-level conversion unit are controlled based on the output voltages or the output currents of the DC-DC conversion units, so that the output voltages or the output currents of all the DC-DC conversion units are equal or close, to implement the purpose of voltage equalization or current equalization.

In some embodiments, the control unit is configured to: control at least one intermediate output level of the N-level conversion unit based on the output voltage or the output current of each of the DC-DC conversion units, where the intermediate output level is between a maximum output level of the N-level conversion unit and a minimum output level of the N-level conversion unit.

In the foregoing embodiments of this application, the at least one intermediate output level of the N-level conversion unit is controlled, to quickly and flexibly adjust input voltages of two adjacent two DC-DC conversion units. In this way, output voltages or output currents of a plurality of DC-DC conversion units can be quickly adjusted.

In some embodiments, the control unit is configured to: obtain a reference voltage based on the output voltages; compare the output voltages with the reference voltage one after another to obtain a voltage difference corresponding to each of the output voltages; and control at least one intermediate output level of the N-level conversion unit based on the voltage differences. Alternatively, the control unit is configured to: obtain a reference current based on the output currents; compare the output currents with the reference current one after another to obtain a current difference corresponding to each of the output currents; and control the at least one intermediate output level of the N-level conversion unit based on the current differences.

In the foregoing embodiments of this application, the at least one intermediate output level of the N-level conversion unit can be flexibly controlled based on a relationship between the output voltages of all DC-DC conversion units. In this way, adaptive calculation can be implemented based on different circuit statuses for voltage equalization or current equalization, which improves voltage equalization or current equalization efficiency.

According to a second aspect, this application provides a charging apparatus, and the charging apparatus includes the voltage conversion circuit according to any embodiment of the first aspect.

According to a third aspect, this application provides an electric device, and the electric device includes the charging apparatus according to the second aspect.

The foregoing description is merely an overview of the technical solutions in this application. In order to better understand the technical means in this application, to achieve implementation according to content of the specification, and to make the above and other objects, features and advantages in this application more obvious and easy to understand, the following describes specific embodiments of this application.

BRIEF DESCRIPTION OF DRAWINGS

One or more embodiments are used as examples for description by using figures in corresponding accompanying drawings. These example descriptions impose no limitation on the embodiments. Elements/Modules and steps with a same reference sign in the accompanying drawings represent similar elements/modules and steps. Unless otherwise stated, the figures in the accompanying drawings impose no limitation on a scale.

DETAILED DESCRIPTION OF EMBODIMENTS

Figure 1:
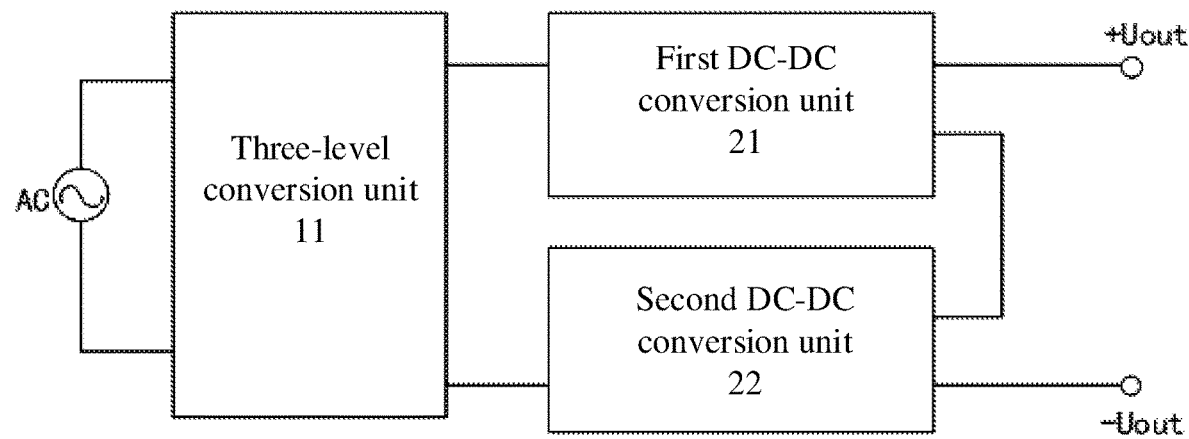
FIG. 1 is a schematic structural block diagram of a voltage conversion circuit according to an embodiment of this application.

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "having" and any other variations thereof in the specification, the claims and the foregoing brief description of drawings of this application are intended to cover a non-exclusive inclusion.

In descriptions of embodiments of this application, the terms "first", "second" and the like are merely intended to distinguish between different objects, and shall not be understood as an indication or implication of relative importance or implicit indication of the number, specific sequence or dominant-subordinate relationship of indicated technical features. In the descriptions of this application, "a plurality of" means at least two unless otherwise specifically stated.

The term "embodiment" described herein means that specific features, structures or characteristics in combination with descriptions of the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described herein may combine with other embodiments.

In the descriptions of embodiments of this application, the term "and/or" in this application describes only an association relationship for describing associated objects and represents that three relationships may exist. For example, A and/or B may represent the following three cases: A alone, both A and B, and B alone. In addition, a character "/" in this specification generally indicates an "or" relationship between contextually associated objects.

In the descriptions of embodiments of this application, unless otherwise specified and defined explicitly, the technical terms "installment", "link", "connection", and "fix" should be understood in their general senses. For example, the terms may be a fixed connection, a detachable connection, or an integrated connection; or may be a mechanical connection or an electrical connection; or may be a direct connection, or an indirect connection through an intermediate medium; or may be an internal connection between two components or an interactive relationship between two components. Persons of ordinary skill in the art can understand specific meanings of these terms in this application based on specific situations.

With the development of electricity and electronics technologies, people's demand for a charging apparatus with a high-power module is increasing. At present, considering performance of a single switch tube and volume of magnetic components, a plurality of lower-power voltage conversion circuits are usually connected in parallel to form a higher-power voltage conversion circuit.

For example, referring to FIG. 1, FIG. 1 is a schematic structural block diagram of a high-power voltage conversion circuit according to an embodiment of this application. The circuit is formed by a three-level conversion unit 11, a first DC-DC conversion unit 21, and a second DC-DC conversion unit, and output terminals of the first DC-DC conversion unit 21 and the second DC-DC conversion unit 22 are connected in series.

In the circuit shown in FIG. 1, when the first DC-DC conversion unit 21 and the second DC-DC conversion unit 22 are working, it needs to be ensured that output voltages of the first DC-DC conversion unit 21 and the second DC-DC conversion unit 22 are the same. However, due to a consistency problem of components, even if the first DC-DC conversion unit 21 and the second DC-DC conversion unit 22 are designed in accordance with same parameters, the output voltages of the first DC-DC conversion unit 21 and the second DC-DC conversion unit 22 may be inconsistent. That is, voltages of the two DC-DC conversion units are not equalized. If the circuit works in a state of unbalanced voltage for a long time, it may cause problems such as different temperatures, different device aging degrees, single circuit being used in excess of the rated design conditions, and shorter service life may be caused on circuits with the same parameters.

Figure 2:
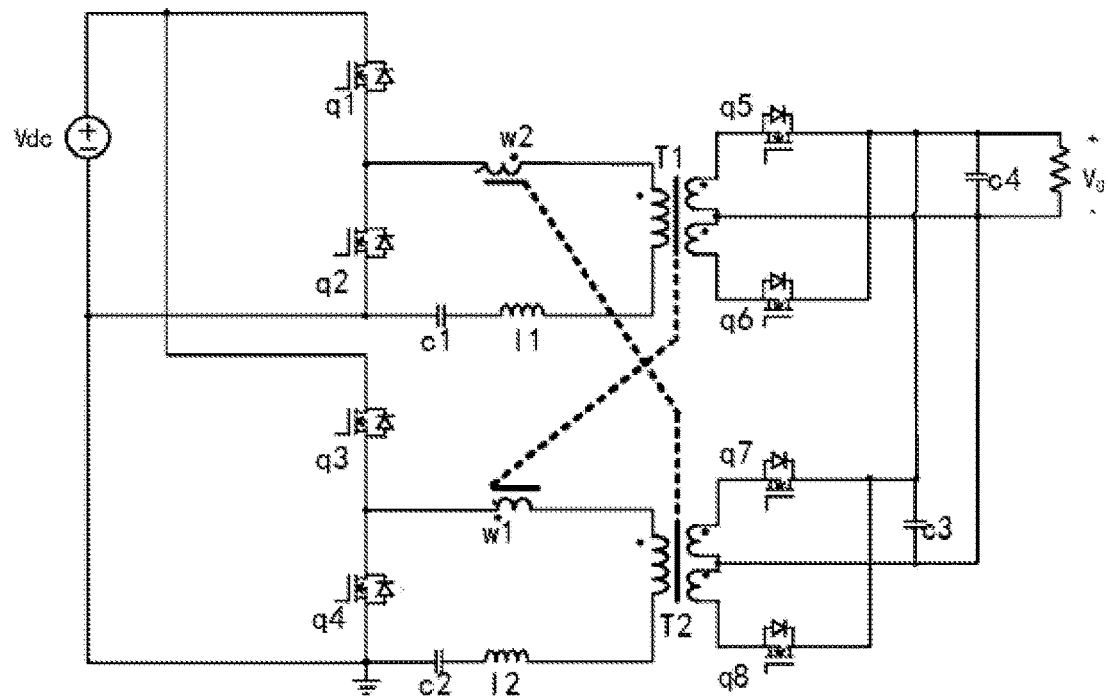
FIG. 2 is a schematic structural diagram of a voltage equalization circuit or a current equalization circuit according to an embodiment of this application.

To solve the voltage equalization problem, two manners may be used. Manner 1: As shown in the circuit in FIG. 1, obtain an output voltage between a first output terminal and a second output terminal of the first DC-DC conversion unit 21 and an output voltage between a first output terminal and a second output terminal of the second DC-DC conversion unit 22; compare magnitudes of the output voltages of the first DC-DC conversion unit 21 and the second DC-DC conversion unit 22; and adjust, based on the magnitudes of the output voltages, the switching frequencies, phase shift angles, and duty cycles of switch tubes in the first DC-DC conversion unit 21 and the second DC-DC conversion unit 22 to equalize their output voltages. Manner 2: Referring to FIG. 2, connect in series transformer auxiliary windings of other modules in a resonant cavity of a one-phase LLC resonant converter to construct a virtual controlled voltage source and then perform phase shift control to implement multi-phase voltage equalization.

However, if voltages are equalized by adjusting the frequencies of the two DC-DC conversion units, a frequency offset Δf is present between the frequencies of the two DC-DC conversion units, to generate low-frequency harmonic oscillation based on Δf. Consequently, serious EMI interference is caused and difficult to be filtered out. If voltage equalization is implemented by adjusting the phase shift angles of the two DC-DC conversion units, a cross current between the two circuits is enlarged when the phase shift angles are different. If voltage equalization is implemented by adjusting the duty cycles of the two DC-DC conversion units, the DC-DC conversion units that previously work in hard switch conditions tend to work in soft switch conditions. Therefore, tubes may explode due to an excessive temperature rise.

Figure 3:
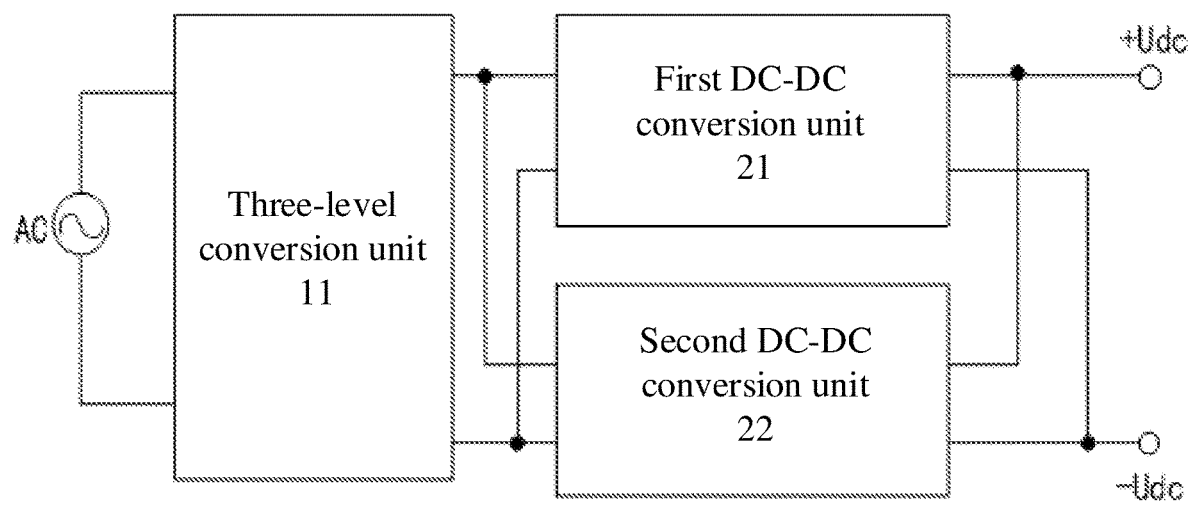
FIG. 3 is a schematic structural block diagram of another voltage conversion circuit according to an embodiment of this application.

For example, referring to FIG. 3, FIG. 3 is a schematic structural block diagram of a high-power voltage conversion circuit according to an embodiment of this application. As shown in FIG. 3, the circuit is formed by a three-level conversion unit 11, a first DC-DC conversion unit 21, and a second DC-DC conversion unit 22. A difference from the embodiment shown in FIG. 1 is that input terminals and output terminals of the first DC-DC conversion unit 21 and the second DC-DC conversion unit 22 are connected in parallel.

In the circuit shown in FIG. 3, when the first DC-DC conversion unit 21 and the second DC-DC conversion unit 22 are working, it needs to be ensured that output currents of the first DC-DC conversion unit 21 and the second DC-DC conversion unit 22 are the same. However, due to a consistency problem of components, even if the first DC-DC conversion unit 21 and the second DC-DC conversion unit 22 are designed in accordance with the same parameters, the output currents of the first DC-DC conversion unit 21 and the second DC-DC conversion unit 22 may be inconsistent. That is, currents of the two DC-DC conversion units are not equalized. If the circuit works in a state of unbalanced current for a long time, it may cause problems such as different temperatures, different device aging degrees, single circuit being used in excess of the rated design conditions, and shorter service life may be caused on circuits with the same parameters.

To solve the current equalization problem, two manners may also be used. Manner 1: As shown in the circuit in FIG. 3, obtain output currents of the first DC-DC conversion unit 21 and the second DC-DC conversion unit 22; compare magnitudes of the output currents of the first DC-DC conversion unit 21 and the second DC-DC conversion unit 22; and adjust, based on the magnitudes of the output currents, the switching frequencies, phase shift angles, and duty cycles of the switch tubes in the first DC-DC conversion unit 21 and the second DC-DC conversion unit 22 to equalize their output currents. Manner 2: Referring to FIG. 2, connect in series transformer auxiliary windings of other modules in a resonant cavity of a certain one-phase LLC resonant converter to construct a virtual controlled voltage source, and then perform phase shift control to implement multi-phase current equalization.

Likewise, if currents are equalized by adjusting the frequencies of the two DC-DC conversion units, a frequency offset Δf is present between the frequencies of the two DC-DC conversion units, to generate low-frequency harmonic oscillation based on Δf. Consequently, serious EMI interference is caused and difficult to be filtered out. If current equalization is implemented by adjusting the phase shift angles of the two DC-DC conversion units, a cross current between the two circuits is enlarged when the phase shift angles are different. If current equalization is implemented by adjusting the duty cycles of the two DC-DC conversion units, the DC-DC conversion units that previously work in hard switch conditions tend to work in soft switch conditions. Therefore, tubes may explode due to an excessive temperature rise.

To avoid the foregoing problem, the embodiments of this application provide a voltage conversion circuit, a charging apparatus, and an electric device, to provide a new manner of connecting multi-level conversion units and DC-DC conversion units. This implements high-power output to satisfy high-power application scenarios, and also implements voltage or current equalization of the back-end DC-DC conversion units by controlling output voltages of the multi-level conversion units, with no need to control frequencies, phase shift angles, or duty cycles of the DC-DC conversion units, thereby avoiding the foregoing problem.

The voltage conversion circuit provided in the embodiments of this application may be used, but is not limited to be used, in electric apparatuses such as vehicles, ships, or aircrafts. The electric device includes a load that consumes electricity, a battery that supplies power for the load, and a charging apparatus that charges the electric device. The charging apparatus is formed by the voltage conversion circuit provided in this application. The charging apparatus may convert alternating current into direct current and then charges the load or the battery. This can not only satisfy high-power application scenarios but also implement voltage equalization among a plurality of DC-DC conversion units by controlling output voltages of the multi-level conversion units to improve circuit operation stability.

An embodiment of this application provides an electric apparatus that uses a battery as the power supply. The electric device may be, but is not limited to, a mobile phone, a tablet, a laptop computer, an electric toy, an electric bicycle, an electric vehicle, a ship, or a spacecraft. The electric toy may be a fixed or mobile electric toy, such as a game console, an electric vehicle toy, an electric ship toy, and an electric airplane toy. The spacecraft may be an airplane, a rocket, a space shuttle, or a spaceship.

Figure 4:
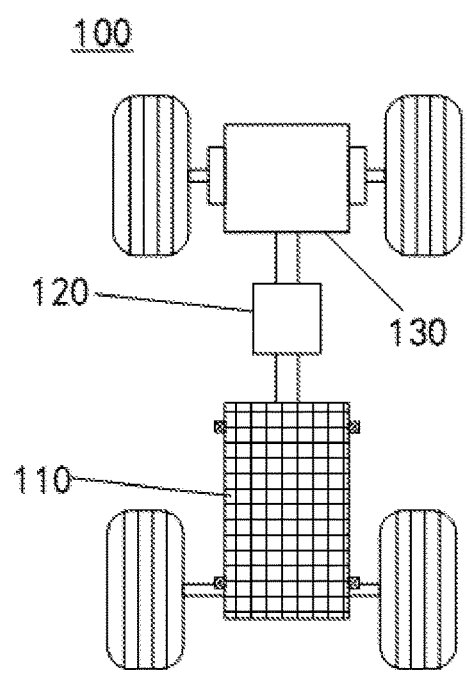
FIG. 4 is a schematic structural diagram of an electric vehicle according to an embodiment of this application.

For case of description, an example that the electric device is a vehicle 100 in an embodiment of this application is used for description in the following embodiments. Referring to FIG. 4, FIG. 4 is a schematic structural diagram of the vehicle 100 according to some embodiments of this application.

The vehicle 100 may be an oil-fueled vehicle, a gas-powered vehicle, or a new energy vehicle. The new energy vehicle may be a battery electric vehicle, a hybrid electric vehicle, an extended-range electric vehicle, or the like. The vehicle 100 is provided with a battery 110 inside, and the battery 110 may be disposed at the bottom, front, or rear of the vehicle 100. The battery 110 may be configured to supply power to the vehicle 100. For example, the battery 100 may be used as an operational power supply for the vehicle 100. The vehicle 100 may further include a controller 120 and a motor 130, and the controller 120 is configured to control the battery 110 to supply power to the motor 130, for example, to satisfy a working electricity need during startup, navigation, and driving of the vehicle 100.

In some embodiments of this application, the battery 110 can be used as not only the operational power supply for the vehicle 100 but also a driving power supply for the vehicle 100, replacing all or a part of the fossil fuel or the natural gas to provide driving power for the vehicle 100.

The battery 110 is any type of energy storage component used to store electricity. For example, it may be a single battery cell, a battery module formed by a plurality of battery cells, or a battery pack including one or more battery modules. A shape of the battery 110 may be subject to actual needs, for example, a cylinder or a cuboid.

In some embodiments, the plurality of battery cells in the battery module may be in series connection, parallel connection, or hybrid connection. The hybrid connection is referred to that the plurality of battery cells are partially connected in series and partially connected in parallel. The battery modules that form a battery pack may also be in series connection, parallel connection, or hybrid connection. The battery pack or the battery module may include other structures in addition to the battery cells, for example, busbars configured to electrically connect the plurality of battery cells.

The controller 120 includes at least one battery management system. The battery management system refers to an electronic system used to manage the battery 110 to ensure the battery 110 works properly. The battery management system may also be connected to the voltage conversion circuit.

Figure 5:
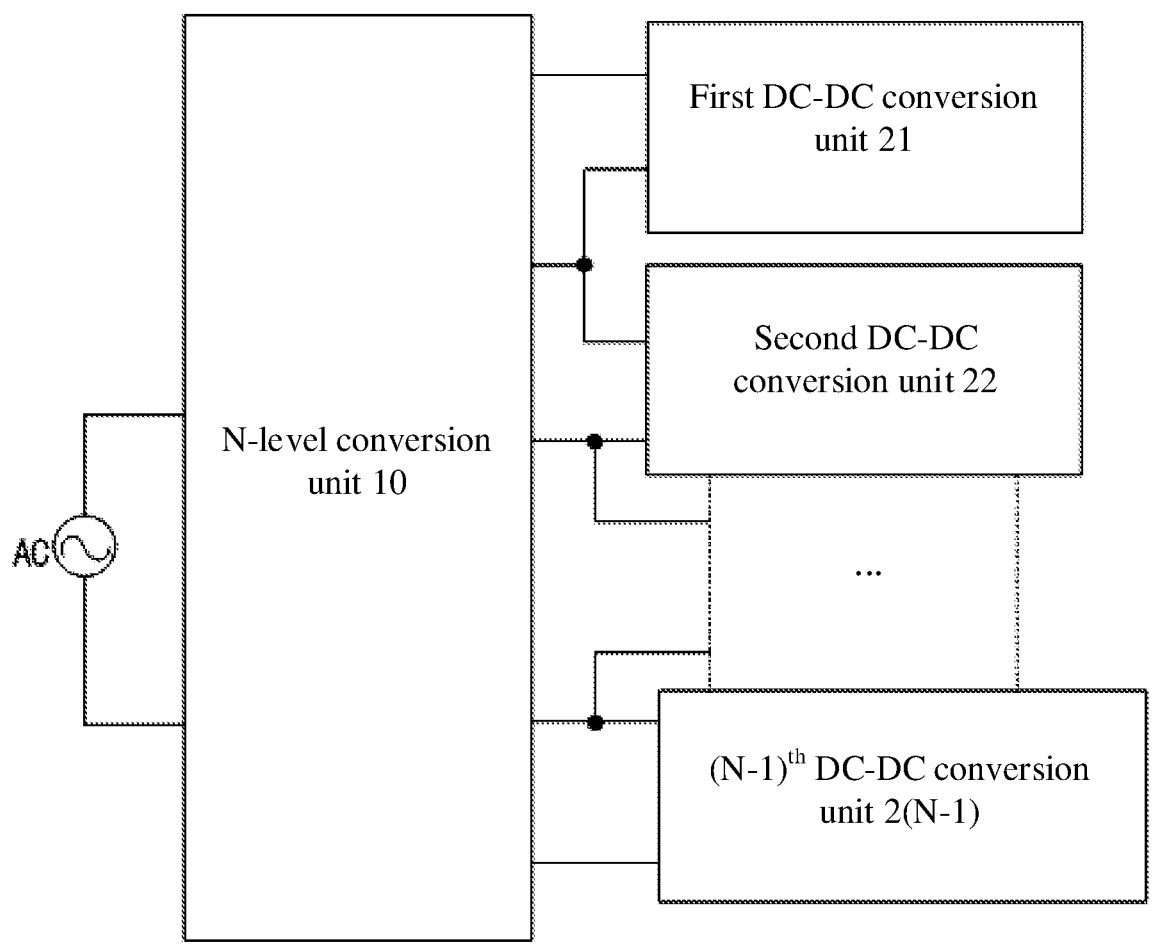
FIG. 5 is a schematic structural block diagram of still another voltage conversion circuit according to an embodiment of this application.

An embodiment of this application provides a voltage conversion circuit. Referring to FIG. 5, the voltage conversion circuit includes an N-level conversion unit 10 and N−1 DC-DC conversion units.

The N-level conversion unit 10 provides N output terminals at different levels. A first input terminal of the $M^{th}$ DC-DC conversion unit is connected to the $M^{th}$ output terminal of the N-level conversion unit 10, a second input terminal of the $M^{th}$ DC-DC conversion unit is connected to the $(M+1)^{th}$ output terminal of the N-level conversion unit 10, and an output level of the $M^{th}$ output terminal of the N-level conversion unit 10 and an output level of the $(M+1)^{th}$ output terminal of N-level conversion unit 10 are adjacent levels, where M and N are positive integers and $N\geq 3$ and $1\leq M<N$.

The N-level conversion unit 10 may convert an input voltage of an alternating current power supply into a multi-level direct current for output. That is, the N-level conversion unit 10 may output a maximum output level, a minimum output level, and at least one intermediate level between the maximum output level and the minimum output level. The N-level conversion unit 10 may include a plurality of switch tubes and output a plurality of levels by controlling on/off state of the switch tubes, for example, a plurality of high levels, zero level, and a plurality of low levels.

The DC-DC conversion units may convert a direct current power supply of a specific voltage rating into a direct current power supply of another voltage rating. Generally, for the $M^{th}$ DC-DC conversion unit, the first input terminal is a positive input terminal and the second input terminal is a negative input terminal.

In the voltage conversion circuit, input terminals of M−1 DC-DC conversion units are correspondingly connected to the N level output terminals of the N-level conversion unit 10. This can increase output power of the voltage conversion circuit, thereby satisfying high-power application scenarios. Furthermore, in the voltage conversion circuit, output levels of the N-level conversion unit 10 can be directly adjusted, so as to adjust input voltages of the DC-DC conversion units and further adjust output voltages or output currents of the DC-DC conversion units. In this way, output voltages or output currents of a plurality of DC-DC conversion units are equal or close to achieve voltage or current equalization effects. It can be learned that in this connection manner, voltage equalization or current equalization is simplified, with no need to control the frequencies, phase shift angles, or duty cycles of the DC-DC conversion units. This can simplify control by a software policy and improve stability of the circuit.

Figure 6:
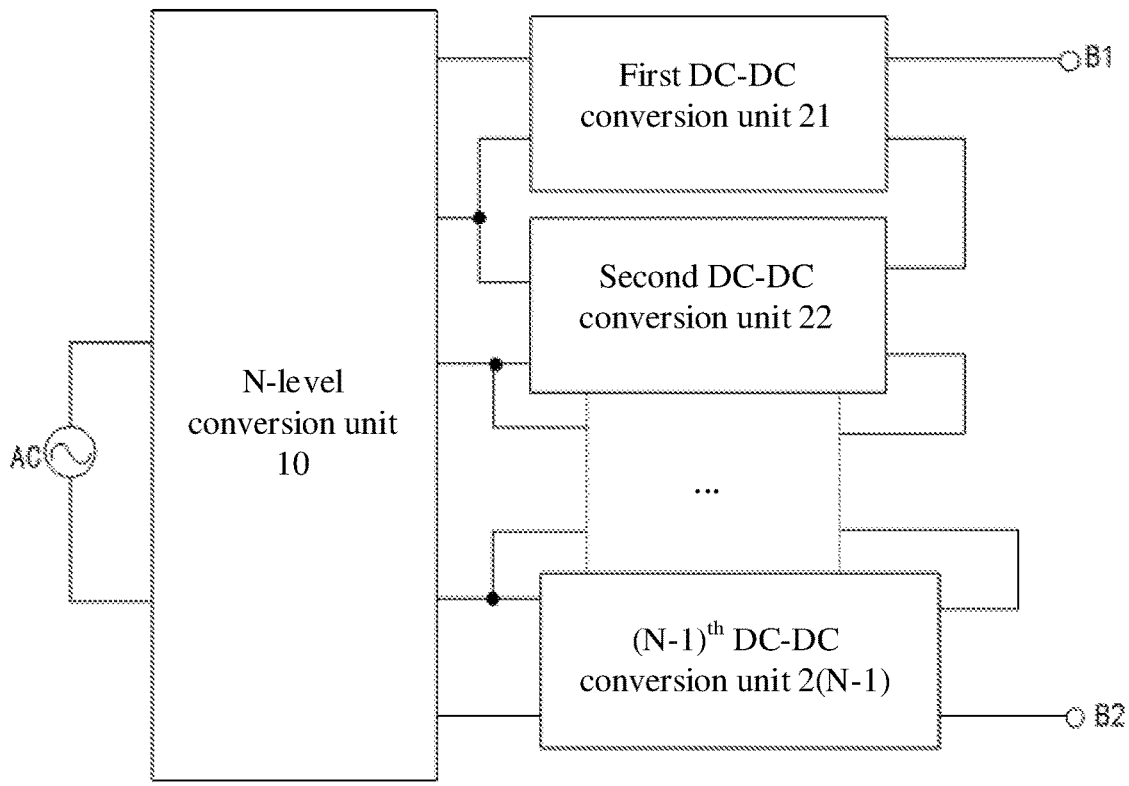
FIG. 6 is a schematic structural block diagram of yet another voltage conversion circuit according to an embodiment of this application.

To implement constant-voltage output, in some embodiments, referring to FIG. 6, a first output terminal of the first DC-DC conversion unit 21 is connected to a first node B1, a first output terminal of the $P^{th}$ DC-DC conversion unit is connected to a second output terminal of the $(P-1)^{th}$ DC-DC conversion unit, and a second output terminal of the $(N-1)^{th}$ DC-DC conversion unit 2 (N−1) is connected to a second node B2, where P is a positive integer and $2\leq P<N$.

Generally, for the $M^{th}$ DC-DC conversion unit, the first input terminal is a positive input terminal and the second input terminal is a negative input terminal, and the first output terminal is a positive output terminal and the second output terminal is a negative output terminal. In this case, the first node B1 is connected to a positive electrode of a busbar and the second node B2 is connected to a negative electrode of the busbar.

In the voltage conversion circuit, the input terminals of the M−1 DC-DC conversion units are correspondingly connected to the N level output terminals of the N-level conversion unit 10, and output terminals of the M−1 DC-DC conversion units are connected in series between the first node B1 and the second node B2. The voltage conversion circuit is connected to a direct current busbar through the first node B1 and the second node B2, which can increase the output power of the voltage conversion circuit to satisfy high-power application scenarios. Furthermore, in the voltage conversion circuit, output levels of the N-level conversion unit 10 can be directly adjusted, so as to adjust input voltages of the DC-DC conversion units and further adjust output voltages of the DC-DC conversion units. In this way, the output voltages of a plurality of DC-DC conversion units are equal or close, to achieve voltage equalization effects. It can be learned that in this connection manner, voltage equalization is simplified, with no need to control the frequencies, phase shift angles, or duty cycles of the DC-DC conversion units. This can simplify control by a software policy and improve stability of the circuit.

Figure 7:
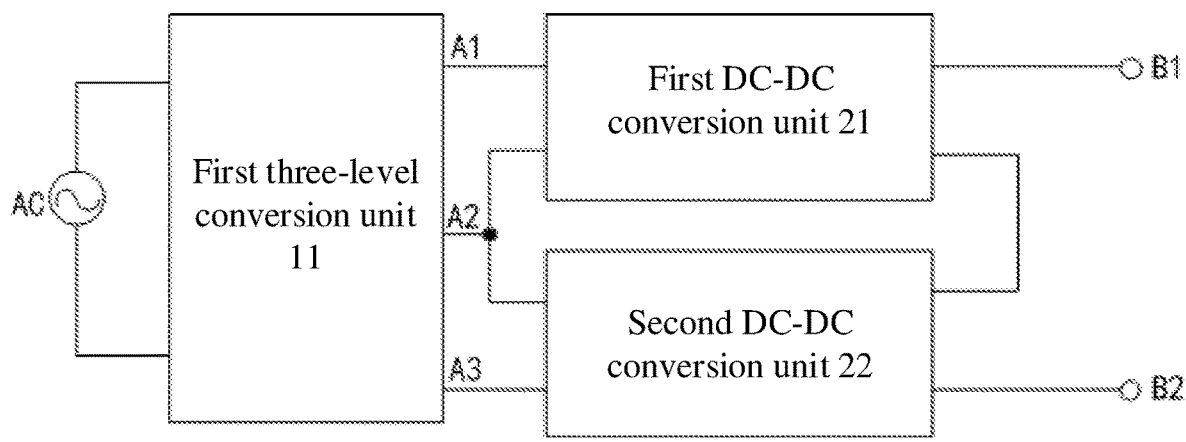
FIG. 7 is a schematic structural block diagram of a fifth voltage conversion circuit according to an embodiment of this application.

In some embodiments, when N=3, referring to FIG. 7, the voltage conversion circuit includes a first three-level conversion unit 11, a first DC-DC conversion unit 21, and a second DC-DC conversion unit 22. The first three-level conversion unit 11 provides a first output terminal A1, a second output terminal A2, and a third output terminal A3, whose levels decrease sequentially. A first input terminal of the first DC-DC conversion unit 21 is connected to the first output terminal A1 of the first three-level conversion unit 11, a second input terminal of the first DC-DC conversion unit 21 and a first input terminal of the second DC-DC conversion unit 22 are connected to the second output terminal A2 of the first three-level conversion unit 21, and a second input terminal of the second DC-DC conversion unit 22 is connected to the third output terminal A3 of the first three-level conversion unit 11. The first output terminal of the first DC-DC conversion unit 21 is connected to the first node B1, a second output terminal of the first DC-DC conversion unit 21 is connected to a first output terminal of the second DC-DC conversion unit 22, and a second output terminal of the second DC-DC conversion unit 22 is connected to the second node B2.

Specifically, the first three-level conversion unit 11 includes a plurality of upper and lower tubes, and three-level states, namely high level, intermediate level, and low lever, can be output based on on/off state of the upper and lower tubes. For example, a level of the first output terminal A1 is +U, a level of the second output terminal A2 is 0, and a level of the third output terminal A3 is −U, where U indicates a magnitude of the level of the first output terminal. A specific value of U can be set based on actual needs, which is not limited herein.

In the voltage conversion circuit, the foregoing connection manner can increase output power of the voltage conversion circuit, thereby satisfying high-power application scenarios. Furthermore, in the voltage conversion circuit, a level of at least one of the first output terminal A1, the second output terminal A2, and the third output terminal A3 of the first three-level conversion unit 11 can be adjusted, so as to adjust an input voltage of the first DC-DC conversion unit 21 and/or an input voltage of the second DC-DC conversion unit 22 and further adjust an output voltage of the first DC-DC conversion unit 21 and/or an output voltage of the second DC-DC conversion unit 22. In this way, the output voltages of the first DC-DC conversion unit 21 and the second DC-DC conversion unit 22 are equal or close, to achieve voltage equalization effects. It can be learned that in this connection manner, output power of the voltage conversion circuit is improved and voltage equalization is simplified, with no need to control the frequencies, phase shift angles, or duty cycles of the DC-DC conversion units. This can simplify control by a software policy and improve stability of the circuit.

In some embodiments, the first three-level conversion unit is a single-phase I-type three-level conversion unit, a three-phase I-type three-level conversion unit, a single-phase T-type three-level conversion unit, or a three-phase T-type three-level conversion unit.

Figure 8:
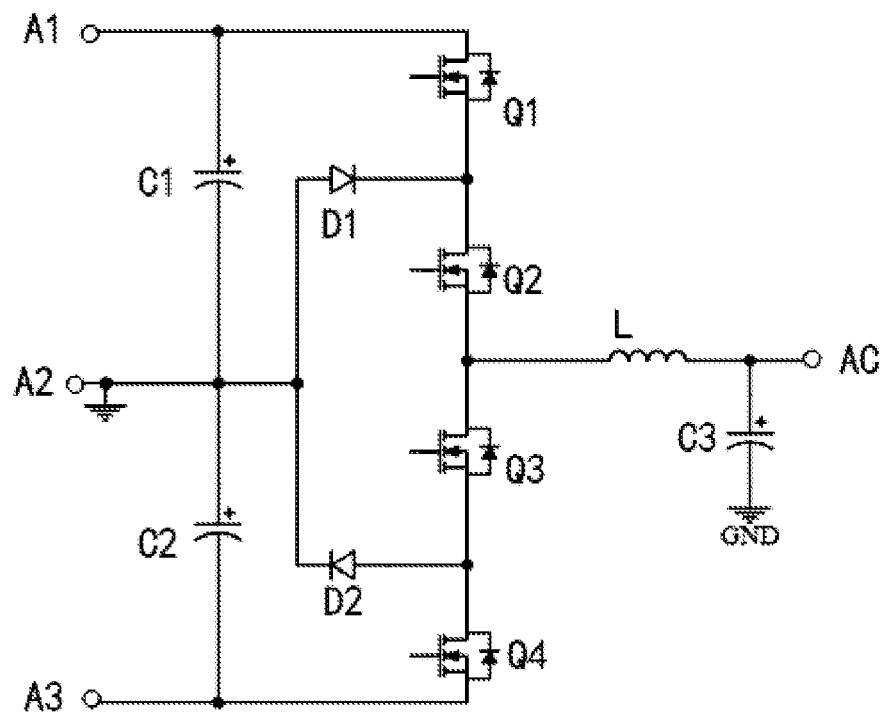
FIG. 8 is a schematic structural diagram of a circuit for a single-phase I-type three-level conversion unit according to an embodiment of this application.
Figure 9:
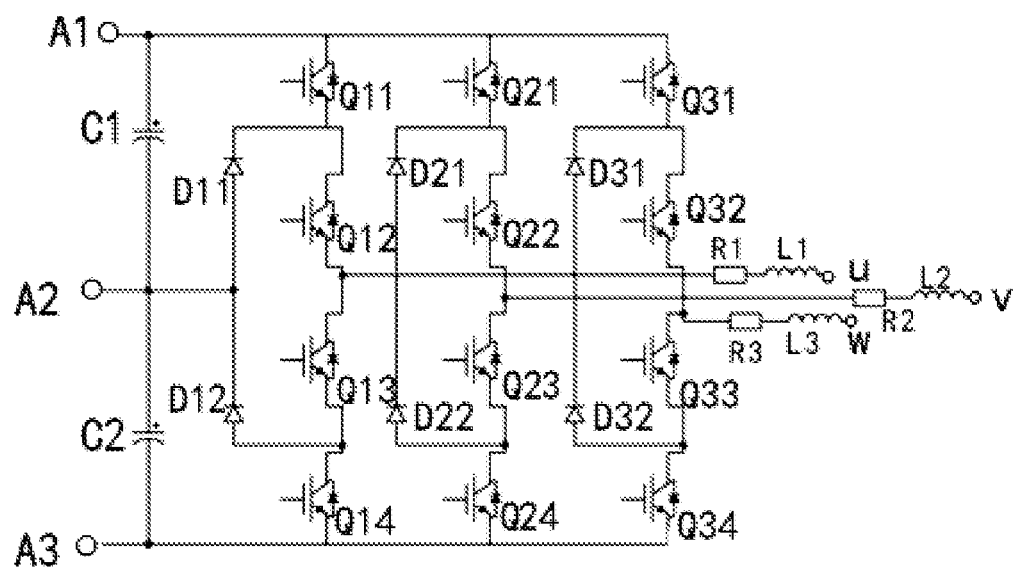
FIG. 9 is a schematic structural diagram of a circuit for a three-phase I-type three-level conversion unit according to an embodiment of this application.
Figure 10:
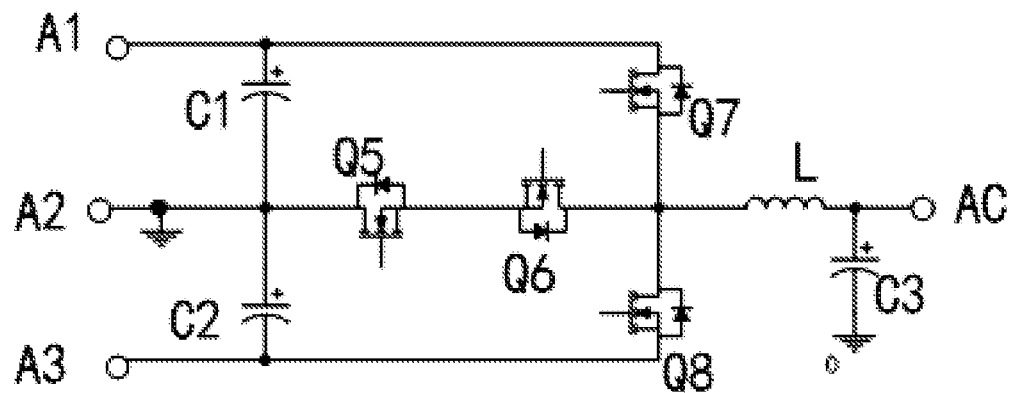
FIG. 10 is a schematic structural diagram of a circuit for a single-phase I-type three-level conversion unit according to an embodiment of this application.
Figure 11:
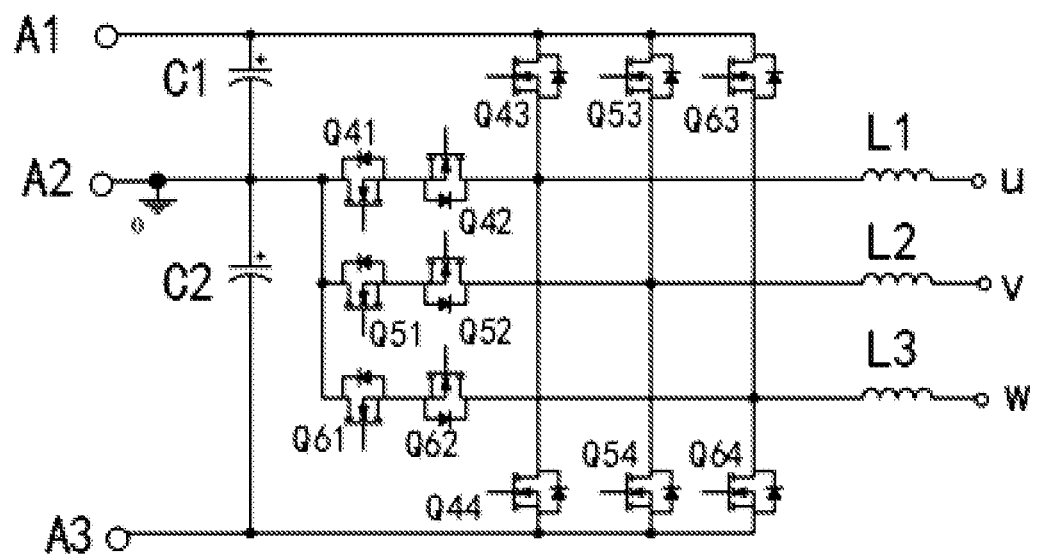
FIG. 11 is a schematic structural diagram of a circuit for a three-phase T-type three-level conversion unit according to an embodiment of this application.

Specifically, referring to FIG. 8, if the first three-level conversion unit is a single-phase I-type three-level conversion unit, the first three-level conversion unit includes four NMOS tubes (Q1 to Q4) and two clamp diodes (D1 and D2); or referring to FIG. 9, if the first three-level conversion unit is a three-phase I-type three-level conversion unit, the first three-level conversion unit includes 12 IGBT tubes (Q11 to Q34) and six clamp diodes (D11 to D32); or referring to FIG. 10, if the first three-level conversion unit is a single-phase T-type three-level conversion unit, the first three-level conversion unit includes four NMOS tubes (Q5 to Q8); or referring to FIG. 11, if the first three-level conversion unit is a three-phase T-type three-level conversion unit, the first three-level conversion unit includes 12 NMOS tubes (Q41 to Q64). In a practical application, the foregoing circuit structure or an appropriate circuit structure in the prior art may be used as the first three-level conversion unit, and a switch tube type may be set based on actual needs, so as to improve flexibility and freedom of circuit design.

In some embodiments, the first three-level conversion unit may also include a component, for example, an input inductor, an input capacitor, an input resistor, or an input capacitor. As shown in FIG. 8, the single-phase I-type three-level conversion unit also includes an input inductor L, an output capacitor C1, an output capacitor C2, and an input capacitor C3. In a practical application, for a specific circuit structure of the first three-level conversion unit, refer to any appropriate circuit structure in the prior art, which is not limited by the foregoing embodiments.

In some embodiments, the input terminals of the N-level conversion unit 10 are connected to a single-phase alternating current power supply or a three-phase alternating current power supply. Specifically, if the first three-level conversion unit is a single-phase I-type three-level conversion unit or a single-phase T-type three-level conversion unit, its input terminals are connected to the single-phase alternating current power supply. If the first three-level conversion unit is a three-phase I-type three-level conversion unit or a three-phase T-type three-level conversion unit, its input terminals are connected to the three-phase alternating current power supply. Different circuit structures for the N-level conversion unit can adapt to different alternating current power supplies, thereby improving adaptability and compatibility of the voltage conversion circuit.

In some embodiments, the DC-DC conversion unit is an LLC circuit, a CLLLC circuit, a phase-shifting full-bridge converter (Phase-Shifting Full-Bridge Converter, PSFB) circuit, or any other appropriate circuit in the art that can be used to convert voltage rating, which is not limited herein. The LLC circuit is a resonant conversion circuit, and includes two inductors and one capacitor. The CLLLC circuit is a resonant conversion circuit, and includes two capacitors and three inductors. For the specific structures of the LLC circuit, the CLLLC circuit and the PFSB circuit, refer to conventional circuits in the prior art. The specific circuit structures are not described in detail herein. It can be learned that during design of a voltage conversion circuit, different circuit structures for DC-DC conversion units can be selected based on actual needs, so as to improve flexibility of the voltage conversion circuit.

In some embodiments, the voltage conversion circuit further includes a control unit. The control unit is connected to the N-level conversion unit and the N−1 DC-DC conversion units. The control unit is configured to control output levels of the N-level conversion unit, so that a difference between output voltages of the DC-DC conversion units is less than or equal to a first threshold.

Specifically, the control unit is connected to control terminals of the N-level conversion unit and the N−1 DC-DC conversion units. For example, the control unit is connected to the control terminals of switch tubes in the N-level conversion unit and the control terminals of switch tubes in the N−1 DC-DC conversion units.

In the voltage conversion circuit, an input voltage of each of the DC-DC conversion units can be adjusted by controlling output levels of the N-level conversion unit. In this way, when the input voltage of each of the DC-DC conversion unit changes, the output voltage of each of the DC-DC conversion units is adjusted accordingly. Therefore, the output levels of the N-level conversion unit can be controlled to make the output voltages of all DC-DC conversion units equal or close. That is, a difference between output voltages of the DC-DC conversion units is less than or equal to a first threshold. The first threshold may be 0A, which can be set based on actual needs in a practical application and is not limited herein.

In some embodiments, the control unit is configured to: obtain an output voltage of each of the DC-DC conversion units; and control the output levels of the N-level conversion unit based on the output voltage of each of the DC-DC conversion units.

Specifically, a voltage sampling unit can be disposed at the first output terminal of each of the DC-DC conversion units, and the voltage sampling unit can collect the output voltage data of each of the DC-DC conversion units. Then, the control unit can obtain the output voltages of all the DC-DC conversion units based on the output voltage data from the voltage sampling units. Finally, the control unit controls the output levels of the N-level conversion unit based on a magnitude of each of the output voltages to make the output voltages of all the DC-DC conversion units equal or close, thereby implementing voltage equalization among a plurality of DC-DC conversion units. It can be learned that in this control manner for voltage equalization, frequencies, phase shift angles, or duty cycles of the DC-DC conversion units do not need to be adjusted, thereby simplifying control and improving operating stability of the circuit.

In a practical application, the voltage sampling unit may be implemented by an existing chip module (for example, an integrated circuit IC) or a conventional circuit in the art. A circuit structure of the voltage sampling unit is not described in detail herein.

For example, referring to FIG. 7, for the voltage conversion circuit including the first three-level conversion unit 11, the control unit may be connected to the first three-level conversion unit 11, the first DC-DC conversion unit 21, and the second DC-DC conversion unit 22. Then, the control unit can obtain a first output voltage U1 between the first output terminal and the second output terminal of the first DC-DC conversion unit 21 and a second output voltage U2 between the first output terminal and the second output terminal of the second DC-DC conversion unit 22, and adjusts magnitudes of levels at the output terminals of the first three-level conversion unit 11 based on magnitudes of the first output voltage U1 and the second output voltage U2.

For example, if the first output voltage U1 is less than the second output voltage U2, the control unit can control to increase magnitude of a level at the second output terminal A2 of the first three-level conversion unit 11, so as to increase the voltage between the first output terminal A1 and the second output terminal A2 of the first three-level conversion unit 11 and decrease the voltage between the second output terminal A2 and the third output terminal A3 of the first three-level conversion unit 11. In this way, the input voltage of the first DC-DC conversion unit 21 is increased, while the input voltage of the second DC-DC conversion unit 22 is decreased. Consequently, the output voltage of the first DC-DC conversion unit 21 is increased, while the output voltage of the second DC-DC conversion unit 22 is decreased. Likewise, if the first output voltage U1 is greater than the second output voltage U2, the control unit can control to decrease the magnitude of the level at the second output terminal A2 of the first three-level conversion unit 11, so as to decrease the voltage between the first output terminal A1 and the second output terminal A2 of the first three-level conversion unit 11 and increase the voltage between the second output terminal A2 and the third output terminal A3 of the first three-level conversion unit 11. In this way, the input voltage of the first DC-DC conversion unit 21 is decreased, while the input voltage of the second DC-DC conversion unit 22 is increased. As a result, the output voltage of the first DC-DC conversion unit 21 is decreased, and the output voltage of the second DC-DC conversion unit 22 is increased. It can be learned that in the foregoing control manner, the first output voltage U1 of the first DC-DC conversion unit 21 is eventually equal or close to the second output voltage U2 of the second DC-DC conversion unit 22, implementing voltage equalization.

In a practical application, only the magnitude of the level at the first output terminal A1 or the third output terminal A3 of the first three-level conversion unit 11 can be controlled, so as to change the magnitude of the voltage between the first output terminal A1 and the second output terminal A2 of the first three-level conversion unit 11. Alternatively, only the magnitude of the voltage between the second output terminal A2 and the third output terminal A3 of the first three-level conversion unit 11 is changed to implement voltage equalization. This control manner needs to fall within the protection scope of the embodiments of this application.

In some embodiments, the control unit is configured to: control at least one intermediate output level of the N-level conversion unit based on the output voltage of each of the DC-DC conversion units, where the intermediate output level is between a maximum output level of the N-level conversion unit and a minimum output level of the N-level conversion unit.

Specifically, referring to FIG. 7, for the voltage conversion circuit including the first three-level conversion unit 11, the level at the second output terminal A2 of the first three-level conversion unit 11 may be controlled based on the first output voltage of the first DC-DC conversion unit 21 and the second output voltage of the second DC-DC conversion unit 22. The level at the second output terminal A2 is also referred to as the intermediate output level of the first three-level conversion unit 11. By means of control of the intermediate output level, the input voltages of the first DC-DC conversion unit 21 and the second DC-DC conversion unit 22 can be adjusted quickly, so that magnitudes of output currents of the first DC-DC conversion unit 21 and the second DC-DC conversion unit 22 are adjusted to be equal or basically equal. It can be learned that in this connection manner provided by this application, the at least one intermediate output level of the N-level conversion unit is controlled, to quickly and flexibly adjust input voltages of two adjacent two DC-DC conversion units. In this way, the output currents of the DC-DC conversion units can be quickly adjusted.

In some embodiments, the control unit is configured to: obtain a reference voltage based on the output voltage of each of the DC-DC conversion units; compare the output voltages of the DC-DC conversion units with the reference voltage one after another to obtain a voltage difference corresponding to the output voltage of each of the DC-DC conversion units; and control at least one intermediate output level of the N-level conversion unit based on each of the voltage differences.

Specifically, for the voltage conversion circuit including the N-level conversion unit, the control unit may obtain the magnitudes of the output voltages between the first output terminal and the second output terminal of all the DC-DC conversion units, which are U1, U2, . . . , and U (N−1). Then, the control unit performs calculation on these output voltages to obtain an average voltage value and uses the average voltage value as the reference voltage. Next, the control unit compares each of the output voltages with the reference voltage to obtain the voltage difference corresponding to each of the output voltages. Each of the voltage differences is processed by using a PI controller to obtain at least one voltage instruction. Finally, the control unit controls the on/off state of the switch tubes in the N-level conversion unit based on the at least one voltage instruction, so as to control at least one intermediate output level of the N-level conversion unit.

It can be learned that in the voltage equalization manner, the at least one intermediate output level of the N-level conversion unit can be flexibly controlled based on a relationship between the output voltages of all DC-DC conversion units. In this way, adaptive calculation can be performed based on different circuit statuses for voltage equalization, which improves voltage equalization efficiency.

It can be understood that: in the control manner, the intermediate output level of the N-level conversion unit is controlled and the N-level conversion unit is provided with N−2 intermediate level output terminals, so there are a maximum of N−2 voltage instructions. In a practical application, any one of the output currents of the DC-DC conversion units may be selected as the reference voltage, for example, U1 may be selected as the reference voltage. Generally, an average value is selected as the reference voltage for ensuring control accuracy.

For example, referring to FIG. 7, for the voltage conversion circuit including the first three-level conversion unit 11, a voltage sampling unit may be used to obtain the first output voltage U1 of the first DC-DC conversion unit 21 and the second output voltage U2 of the second DC-DC conversion unit 22. Then, the first output voltage U1 and the second output voltage U2 are compared to obtain a voltage difference. Then, the voltage difference is processed by the PI controller to obtain a voltage instruction. The control unit controls the on/off state of the switch tubes in the first three-level conversion unit 11 based on the voltage instruction, so as to control the magnitude of the level at the second output terminal A2 of the first three-level conversion unit 11. Finally, the input voltage of the first DC-DC conversion unit 21 and the input voltage of the second DC-DC conversion unit 22 are adjusted, to achieve voltage equalization effects. The first output voltage, the second output voltage, or an average voltage value of the first output voltage and the second output voltage may be selected as the reference voltage, which is not limited herein.

To sum up, the voltage conversion circuit provided in this embodiment of this application can not only increase the output power of the voltage conversion circuit to satisfy high-power application scenarios, and also implements voltage equalization by adjusting the output voltages of a plurality of DC-DC conversion units through adjustment of the output level of the N-level conversion unit. This voltage equalization control manner simplifies voltage equalization control.

Figure 12:
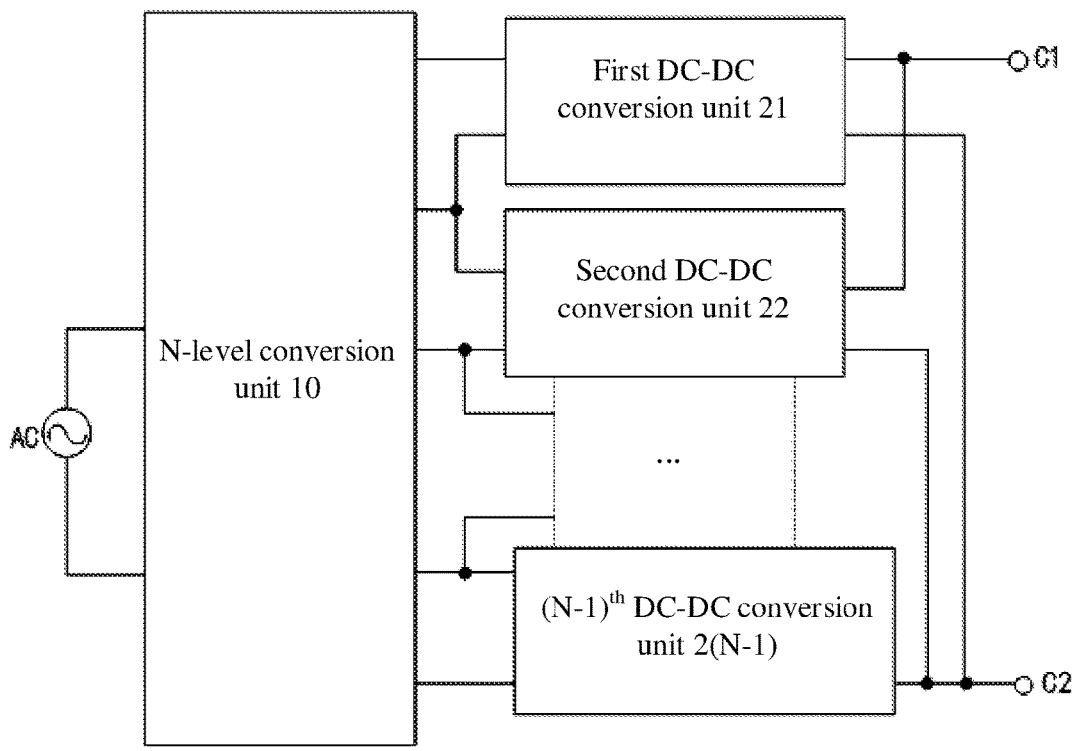
FIG. 12 is a schematic structural block diagram of a sixth voltage conversion circuit according to an embodiment of this application.

To implement constant-current output, referring to FIG. 12, the voltage conversion circuit also includes an N-level conversion unit 10 and N−1 DC-DC conversion units. A difference from the embodiment illustrated by FIG. 6 is that in the voltage conversion circuit the first output terminal of each of the DC-DC conversion units is connected to a third node C1, and the second output terminal of each of the DC-DC conversion units is connected to a fourth node C2.

Generally, for the $M^{th}$ DC-DC conversion unit, the first input terminal is a positive input terminal and the second input terminal is a negative input terminal, and the first output terminal is a positive output terminal and the second output terminal is a negative output terminal. In this case, the third node C1 is connected to a positive electrode of a busbar and the fourth node C2 is connected to a negative electrode of the busbar.

In the voltage conversion circuit, the input terminals of the M−1 DC-DC conversion units are correspondingly connected to the N level output terminals of the N-level conversion unit 10, and output terminals of the M−1 DC-DC conversion units are connected in parallel between the third node C1 and the fourth node C2. The third node C1 and the fourth node C2 may be connected to a direct current busbar, which can increase the output power of the voltage conversion circuit to satisfy high-power application scenarios. Furthermore, in the voltage conversion circuit, output levels of the N-level conversion unit 10 can be directly adjusted, so as to adjust input voltages of the DC-DC conversion units and further adjust output currents of the DC-DC conversion units. In this way, the output currents of a plurality of DC-DC conversion units are equal or close to achieve current equalization effects. It can be learned that in this connection manner, current equalization is simplified, with no need to control the frequencies, phase shift angles, or duty cycles of the DC-DC conversion units. This can simplify control by a software policy and improve stability of the circuit.

Figure 13:
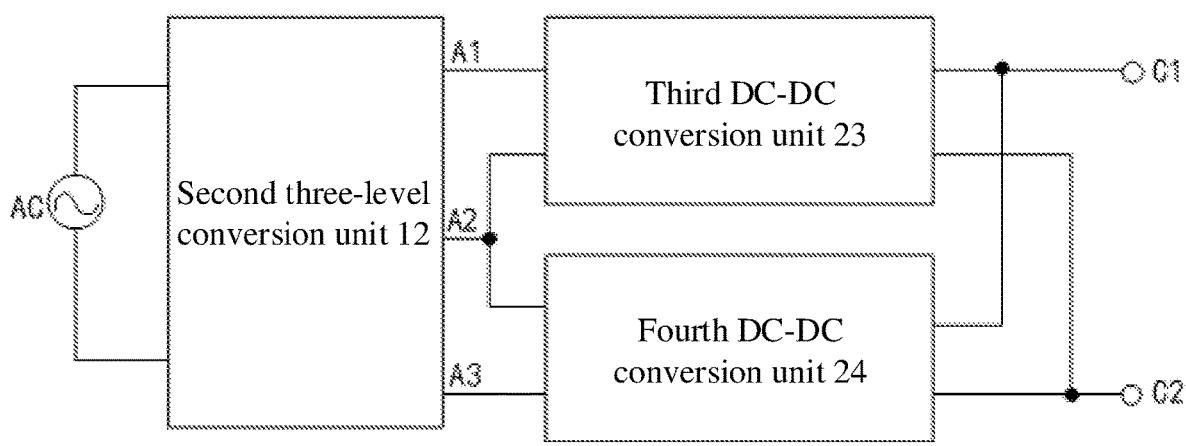
FIG. 13 is a schematic structural block diagram of a seventh voltage conversion circuit according to an embodiment of this application.

In some embodiments, when N=3, referring to FIG. 13, the voltage conversion circuit includes a second three-level conversion unit 12, a third DC-DC conversion unit 23, and a fourth DC-DC conversion unit 24. The second three-level conversion unit 12 provides a first output terminal A1, a second output terminal A2, and a third output terminal A3, whose levels decrease sequentially. A first input terminal of the third DC-DC conversion unit 23 is connected to the first output terminal A1 of the second three-level conversion unit 12, a second input terminal of the third DC-DC conversion unit 23 and a first input terminal of the fourth DC-DC conversion unit 24 are connected to the second output terminal A2 of the second three-level conversion unit 12, and a second input terminal of the fourth DC-DC conversion unit 24 is connected to the third output terminal A3 of the second three-level conversion unit 12. A first output terminal of the third DC-DC conversion unit 23 and a first output terminal of the fourth DC-DC conversion unit 24 are connected to a third node C1, and a second output terminal of the third DC-DC conversion unit 23 and a second output terminal of the fourth DC-DC conversion unit 24 are connected to a fourth node C2.

Specifically, the second three-level conversion unit 12 includes a plurality of upper and lower tubes, and three-level states, namely high level, intermediate level, and low lever, can be output based on on/off state of the upper and lower tubes. For example, a level of the first output terminal A1 is +U, a level of the second output terminal A2 is 0, and a level of the third output terminal A3 is-U, where U indicates a magnitude of the level of the first output terminal. A specific value of U can be set based on actual needs, which is not limited herein.

In the voltage conversion circuit, the foregoing connection manner can increase output power of the voltage conversion circuit, thereby satisfying high-power application scenarios. Furthermore, in the voltage conversion circuit, a level of at least one of the first output terminal A1, the second output terminal A2, and the third output terminal A3 of the second three-level conversion unit 12 can be adjusted, so as to adjust an input voltage of the third DC-DC conversion unit 23 and/or an input voltage of the fourth DC-DC conversion unit 24 and further adjust an output current of the third DC-DC conversion unit 23 and/or an output current of the fourth DC-DC conversion unit 24. In this way, the output currents of the first DC-DC conversion unit 23 and the second DC-DC conversion unit 24 are equal or close, to achieve current equalization effects. It can be learned that in this connection manner, output power of the voltage conversion circuit is improved and current equalization is simplified, with no need to control the frequencies, phase shift angles, or duty cycles of the DC-DC conversion units. This can simplify control by a software policy and improve stability of the circuit.

In some embodiments, the second three-level conversion unit is a single-phase I-type three-level conversion unit, a three-phase I-type three-level conversion unit, a single-phase T-type three-level conversion unit, or a three-phase T-type three-level conversion unit.

Specifically, referring to FIG. 8, if the second three-level conversion unit is a single-phase I-type three-level conversion unit, the second three-level conversion unit includes four NMOS tubes (Q1 to Q4) and two clamp diodes (D1 and D2); or referring to FIG. 9, if the second three-level conversion unit is a three-phase I-type three-level conversion unit, the second three-level conversion unit includes 12 IGBT tubes (Q11 to Q34) and six clamp diodes (D11 to D32); or referring to FIG. 10, if the second three-level conversion unit is a single-phase T-type three-level conversion unit, the second three-level conversion unit includes four NMOS tubes (Q5 to Q8); or referring to FIG. 11, if the second three-level conversion unit is a three-phase T-type three-level conversion unit, the second three-level conversion unit includes 12 NMOS tubes (Q41 to Q64). In a practical application, the foregoing circuit structure or an appropriate circuit structure in the prior art may be used as the second three-level conversion unit, and a switch tube type may be set based on actual needs, so as to improve flexibility and freedom of circuit design.

In some embodiments, the second three-level conversion unit may further include a component, for example, an input inductor, an input capacitor, an input resistor, or an input capacitor. As shown in FIG. 8, the single-phase I-type three-level conversion unit further includes an input inductor L, an output capacitor C1, an output capacitor C2, and an input capacitor C3. In a practical application, for a specific circuit structure of the second three-level conversion unit, refer to any appropriate circuit structure in the prior art, which is not limited by the foregoing embodiments.

In some embodiments, the input terminals of the N-level conversion unit 10 are connected to a single-phase alternating current power supply or a three-phase alternating current power supply. Specifically, if the second three-level conversion unit is a single-phase I-type three-level conversion unit or a single-phase T-type three-level conversion unit, its input terminals are connected to the single-phase alternating current power supply. If the second three-level conversion unit is a three-phase I-type three-level conversion unit or a three-phase T-type three-level conversion unit, its input terminals are connected to the three-phase alternating current power supply. Different circuit structures for the N-level conversion unit can adapt to different alternating current power supplies, thereby improving adaptability and compatibility of the voltage conversion circuit.

In some embodiments, the DC-DC conversion unit is an LLC circuit, a CLLLC circuit, a phase-shifting full-bridge converter (Phase-Shifting Full-Bridge Converter, PSFB) circuit, or any other appropriate circuit in the art that can be used to convert voltage rating, which is not limited herein. The LLC circuit is a resonant conversion circuit, and includes two inductors and one capacitor. The CLLLC circuit is a resonant conversion circuit, and includes two capacitors and three inductors. For the specific structures of the LLC circuit, the CLLLC circuit and the PFSB circuit, refer to conventional circuits in the prior art. The specific circuit structures are not described in detail herein. It can be learned that during design of a voltage conversion circuit, different circuit structures for DC-DC conversion units can be selected based on actual needs, so as to improve flexibility of the voltage conversion circuit.

In some embodiments, the voltage conversion circuit further includes a control unit. The control unit is connected to the N-level conversion unit and the N−1 DC-DC conversion units. The control unit is configured to control output levels of the N-level conversion unit, so that a difference between output currents of the DC-DC conversion units is less than or equal to a first threshold.

Specifically, the control unit is connected to control terminals of the N-level conversion unit and the N−1 DC-DC conversion units. For example, the control unit is connected to the control terminals of switch tubes in the N-level conversion unit and the control terminals of switch tubes in the N−1 DC-DC conversion units.

In the voltage conversion circuit, an input voltage of each of the DC-DC conversion units can be adjusted by controlling output levels of the N-level conversion unit. In this way, when the input voltage of each of the DC-DC conversion unit changes, the output current of each of the DC-DC conversion units is adjusted accordingly. Therefore, the output levels of the N-level conversion unit can be controlled to make the output currents of all DC-DC conversion units equal or close. That is, a difference between output currents of the DC-DC conversion units is less than or equal to a second threshold. The second threshold may be OA, which can be set based on actual needs in a practical application and is not limited herein.

In some embodiments, the control unit is configured to: obtain an output current of each of the DC-DC conversion units; and control the output levels of the N-level conversion unit based on the output current of each of the DC-DC conversion units.

Specifically, a current sampling unit can be disposed at the first output terminal of each of the DC-DC conversion units, and the current sampling unit can collect the output current data of each of the DC-DC conversion units. Then, the control unit can obtain the output currents of all the DC-DC conversion units based on the output current data from the voltage sampling units. Finally, the control unit controls the output levels of the N-level conversion unit based on a magnitude of each of the output currents, so that the output currents of all the DC-DC conversion units are equal or close, thereby implementing current equalization among a plurality of DC-DC conversion units. It can be learned that in this control manner for current equalization, frequencies, phase shift angles, or duty cycles of the DC-DC conversion units do not need to be adjusted, thereby simplifying control and improving operating stability of the circuit.

In a practical application, the current sampling unit may be implemented by an existing chip module (for example, an integrated circuit IC) or a conventional circuit in the art. A circuit structure of the current sampling unit is not described in detail herein.

For example, referring to FIG. 13, for the voltage conversion circuit including the second three-level conversion unit 12, the control unit may be connected to the second three-level conversion unit 12, the third DC-DC conversion unit 23, and the fourth DC-DC conversion unit 24. Then, the control unit can obtain a first output current I1 of the third DC-DC conversion unit 23 and a second output current I2 of the fourth DC-DC conversion unit 24, and adjusts magnitudes of levels at the output terminals of the second three-level conversion unit 12 based on magnitudes of the first output current I1 and the second output current I2.

For example, if the first output current I1 is less than the second output current I2, the control unit can control to increase magnitude of a level at the second output terminal A2 of the second three-level conversion unit 12, so as to increase the voltage between the first output terminal A1 and the second output terminal A2 of the second three-level conversion unit 12 and decrease the voltage between the second output terminal A2 and the third output terminal A3 of the second three-level conversion unit 12. In this way, the input voltage of the third DC-DC conversion unit 23 is increased, while the input voltage of the fourth DC-DC conversion unit 24 is decreased. Consequently, the output current of the third DC-DC conversion unit 23 is increased, while the output current of the fourth DC-DC conversion unit 24 is decreased. Likewise, if the first output current I1 is greater than the second output current I2, the control unit can control to decrease the magnitude of the level at the second output terminal A2 of the second three-level conversion unit 12, so as to decrease the voltage between the first output terminal A1 and the second output terminal A2 of the second three-level conversion unit 12 and increase the voltage between the second output terminal A2 and the third output terminal A3 of the second three-level conversion unit 12. In this way, the input voltage of the third DC-DC conversion unit 23 is decreased, while the input voltage of the fourth DC-DC conversion unit 24 is increased. Consequently, the output current of the third DC-DC conversion unit 23 is decreased, while the output current of the fourth DC-DC conversion unit 24 is increased. It can be learned that in the foregoing control manner, the first output current I1 of the third DC-DC conversion unit 23 is eventually equal to or close to the second output current I2 of the fourth DC-DC conversion unit 24, implementing current equalization.

In a practical application, the magnitude of the level at the first output terminal A1 or the third output terminal A3 of the second three-level conversion unit 12 can be merely controlled, so as to change the magnitude of the voltage between the first output terminal A1 and the second output terminal A2 of the second three-level conversion unit 12. Alternatively, merely the magnitude of the voltage between the second output terminal A2 and the third output terminal A3 of the second three-level conversion unit 12 is changed to achieve the current equalization purpose. This control manner needs to fall within the protection scope of the embodiments of this application.

In some embodiments, the control unit is configured to: control at least one intermediate output level of the N-level conversion unit based on the output current of each of the DC-DC conversion units, where the intermediate output level is between a maximum output level of the N-level conversion unit and a minimum output level of the N-level conversion unit.

Specifically, referring to FIG. 13, for the voltage conversion circuit including the second three-level conversion unit 12, the level at the second output terminal A2 of the second three-level conversion unit 12 may be controlled based on the first output current of the third DC-DC conversion unit 23 and the second output current of the fourth DC-DC conversion unit 24. The level at the second output terminal A2 is also referred to as the intermediate output level of the second three-level conversion unit 12. The input voltages of the third DC-DC conversion unit 23 and the fourth DC-DC conversion unit 24 can be adjusted quickly by controlling the intermediate output level, to further adjust magnitudes of output currents of the third DC-DC conversion unit 23 and the fourth DC-DC conversion unit 24 to be equal or basically equal. It can be learned that in the connection manner provided by this application, the at least one intermediate output level of the N-level conversion unit is controlled, to quickly and flexibly adjust input voltages of two adjacent two DC-DC conversion units. In this way, the output currents of the DC-DC conversion units can be quickly adjusted.

In some embodiments, the control unit is configured to: obtain a reference current based on the output current of each of the DC-DC conversion units; compare the output current of each of the DC-DC conversion units with the reference current to obtain a current difference corresponding to the output current of each of the DC-DC conversion units; and control at least one intermediate output level of the N-level conversion unit based on each of the current differences.

Specifically, for the voltage conversion circuit including the N-level conversion unit, the control unit may obtain the magnitudes of the output currents of the first output terminals of all the DC-DC conversion units, which are I1, I2, ..., and I(N−1). Then, the control unit performs calculation on these output currents to obtain an average current value and uses the average current value as the reference current. Next, the control unit compares each of the output currents with the reference current to obtain the current difference corresponding to each of the output currents. Each of the current differences is processed by using a PI controller to obtain at least one voltage instruction. Finally, the control unit controls the on/off state of the switch tubes in the N-level conversion unit based on the at least one voltage instruction, so as to control at least one intermediate output level of the N-level conversion unit.

It can be learned that in the current equalization manner, the at least one intermediate output level of the N-level conversion unit can be flexibly controlled based on a relationship between the output currents of all the DC-DC conversion units. In this way, adaptive calculation can be implemented based on different circuit statuses for current equalization, which improves current equalization efficiency.

It can be understood that: in the control manner, the intermediate output level of the N-level conversion unit is controlled and the N-level conversion unit is provided with N−2 intermediate level output terminals, so there are a maximum of N−2 voltage instructions. In a practical application, any one of the output currents of the DC-DC conversion units may be selected as the reference current, for example, I1 may be selected as the reference current. Generally, an average value is selected as the reference current for ensuring control accuracy.

For example, referring to FIG. 13, for the voltage conversion circuit including the second three-level conversion unit 12, a current sampling unit can be used to obtain the first output current I1 of the third DC-DC conversion unit 23 and the second output current I2 of the fourth DC-DC conversion unit 24. Then, the first output current I1 and the second output current I2 are compared to obtain a current difference. Next, the current difference is processed by the PI controller to obtain a voltage instruction. The control unit controls the on/off state of the switch tubes in the second three-level conversion unit 12 based on the voltage instruction, so as to control the magnitude of the level at the second output terminal A2 of the second three-level conversion unit 12. Finally, the input voltage of the third DC-DC conversion unit 23 and the input voltage of the fourth DC-DC conversion unit 24 are adjusted, to achieve current equalization effects. In this case, the first output current, the second output current, or an average current value of the first output current and the second output current may be selected as the reference current, which is not limited herein.

To sum up, the voltage conversion circuit provided by this embodiment of this application can not only increase the output power of the voltage conversion circuit and satisfy high-power application scenarios, but also adjust the output currents of a plurality of DC-DC conversion units by adjusting the output level of the N-level conversion unit to achieve current equalization effects. This current equalization control manner simplifies current equalization control.

According to another aspect of the embodiments of this application, the embodiments of this application further provide a charging apparatus, and the charging apparatus includes the voltage conversion circuit according to any one of the foregoing embodiments.

According to still another aspect of the embodiments of this application, the embodiments of this application further provide an electric device, and the electric device includes the charging apparatus according to any one of the foregoing embodiments.

It should be noted that apparatus embodiments described above are merely exemplary, and units described as separate components may or may not be physically separate. A component displayed as a unit may be one or more physical units, and may be located in one place, or may be distributed in a plurality of places. Some or all of the modules may be selected based on an actual requirement, to achieve the objectives of the solutions in the embodiments.

Finally, it should be noted that the foregoing embodiments are merely intended to describe the technical solutions of this disclosure, and are not intended to limit this disclosure. Under the idea of this disclosure, the foregoing embodiments or the technical features in different embodiments can also be combined, the steps can be implemented in any order, and there are many other changes in different aspects of this disclosure as described above, which, for the sake of brevity, are not provided in detail. Although this disclosure is described in detail with reference to the foregoing embodiments, persons of ordinary skill in the art should understand that modifications can be made to the technical solutions described in the foregoing embodiments, or equivalent substitutions can be made to some technical features therein, and these modifications or substitutions do not make the essence of the corresponding technical solutions depart from the scope of the technical solutions of the embodiments of this disclosure.

The invention claimed is:

1. A voltage conversion circuit, comprising:
an N-level conversion unit, comprising N output terminals at different levels;
N−1 DC-DC conversion units, wherein a first input terminal of an $M^{th}$ DC-DC conversion unit is connected to an $M^{th}$ output terminal of the N-level conversion unit, a second input terminal of the $M^{th}$ DC-DC conversion unit is connected to an $(M+1)^{th}$ output terminal of the N-level conversion unit, and an output level of the $M^{th}$ output terminal and an output level of the $(M+1)^{th}$ output terminal are adjacent levels; and
a control unit connected to the N-level conversion unit and the N−1 DC-DC conversion units, wherein the control unit is configured to:
obtain an output voltage of each of the DC-DC conversion units, obtain a reference voltage based on the output voltages of the DC-DC conversion units, compare the output voltages of the DC-DC conversion units with the reference voltage one after another to obtain voltage differences each corresponding to one of the output voltages of the DC-DC conversion units, and control an intermediate output level of the N-level conversion unit based on the voltage differences; or
obtain an output current of each of the DC-DC conversion units, obtain a reference current based on the output currents of the DC-DC conversion units, compare the output currents of the DC-DC conversion units with the reference current one after another to obtain current differences each corresponding to one of the output currents of the DC-DC conversion units, and control the intermediate output level of the N-level conversion unit based on the current differences;
wherein N and M are positive integers and satisfy N≥3 and 1≤M<N.

2. The voltage conversion circuit according to claim 1, wherein:
each of the N−1 DC-DC conversion units includes a first output terminal and a second output terminal;
a first output terminal of a first DC-DC conversion unit is connected to a first node, a first output terminal of the $P^{th}$ DC-DC conversion unit is connected to a second output terminal of the $(P−1)^{th}$ DC-DC conversion unit, and a second output terminal of the $(N−1)^{th}$ DC-DC conversion unit is connected to a second node; and
P is a positive integer and satisfies 2≤P<N.

3. The voltage conversion circuit according to claim 2, wherein:
N=3, the N-level conversion unit comprises a three-level conversion unit, and the N−1 DC-DC conversion units comprise the first DC-DC conversion unit and a second DC-DC conversion unit;
the three-level conversion unit comprises a first output terminal, a second output terminal, and a third output terminal with levels decreasing sequentially;
a first input terminal of the first DC-DC conversion unit is connected to the first output terminal of the three-level conversion unit, a second input terminal of the first DC-DC conversion unit and a first input terminal of the second DC-DC conversion unit are connected to the second output terminal of the three-level conversion unit, and a second input terminal of the second DC-DC conversion unit is connected to the third output terminal of the three-level conversion unit; and
the first output terminal of the first DC-DC conversion unit is connected to the first node, a second output terminal of the first DC-DC conversion unit is connected to the first output terminal of the second DC-DC conversion unit, and the second output terminal of the second DC-DC conversion unit is connected to the second node.

4. The voltage conversion circuit according to claim 3, wherein the three-level conversion unit is a single-phase I-type three-level conversion unit, a three-phase I-type three-level conversion unit, a single-phase T-type three-level conversion unit, or a three-phase T-type three-level conversion unit.

5. The voltage conversion circuit according to claim 4, wherein the three-level conversion unit is a first three-level conversion unit;
the voltage conversion circuit further comprising:
- a second three-level conversion unit, a third DC-DC conversion unit, and a fourth DC-DC conversion unit;

wherein:
- levels of a first output terminal, a second output terminal, and a third output terminal of the second three-level conversion unit decrease sequentially;
- a first input terminal of the third DC-DC conversion unit is connected to the first output terminal of the second three-level conversion unit, a second input terminal of the third DC-DC conversion unit and a first input terminal of the fourth DC-DC conversion unit are connected to the second output terminal of the second three-level conversion unit, and a second input terminal of the fourth DC-DC conversion unit is connected to the third output terminal of the second three-level conversion unit; and
- the first output terminal of the first DC-DC conversion unit and a first output terminal of the fourth DC-DC conversion unit are connected to a third node, and a second output terminal of the third DC-DC conversion unit and a second output terminal of the fourth DC-DC conversion unit are connected to a fourth node.

6. The voltage conversion circuit according to claim 5, wherein the second three-level conversion unit is a single-phase I-type three-level conversion unit, a three-phase I-type three-level conversion unit, a single-phase T-type three-level conversion unit, or a three-phase T-type three-level conversion unit.

7. The voltage conversion circuit according to claim 1, wherein a first output terminal of each of the N−1 DC-DC conversion units is connected to a first node, and a second output terminal of each of the N−1 DC-DC conversion units is connected to a second node.

8. The voltage conversion circuit according to claim 1, wherein input terminals of the N-level conversion unit are connected to a single-phase alternating current power supply or a three-phase alternating current power supply.

9. The voltage conversion circuit according to claim 1, wherein each of the N−1 DC-DC conversion units is an LLC circuit, a CLLLC circuit, or a phase-shifting full-bridge converter (PSFB) circuit.

10. The voltage conversion circuit according to claim 1, wherein the control unit is further configured to:
- control output levels of the N-level conversion unit, so that a difference between the output voltages of the DC-DC conversion units is less than or equal to a first threshold; or
- control the output levels of the N-level conversion unit, so that a difference between the output currents of the DC-DC conversion units is less than or equal to a second threshold.

11. The voltage conversion circuit according to claim 1, wherein the intermediate output level is between a maximum output level of the N-level conversion unit and a minimum output level of the N-level conversion unit.

12. A charging apparatus, comprising a voltage conversion circuit comprising:
- an N-level conversion unit, comprising N output terminals at different levels; and
- N−1 DC-DC conversion units, wherein a first input terminal of an $M^{th}$ DC-DC conversion unit is connected to an $M^{th}$ output terminal of the N-level conversion unit, a second input terminal of the $M^{th}$ DC-DC conversion unit is connected to an $(M+1)^{th}$ output terminal of the N-level conversion unit, and an output level of the $M^{th}$ output terminal and an output level of the $(M+1)^{th}$ output terminal are adjacent levels; and
- a control unit connected to the N-level conversion unit and the N−1 DC-DC conversion units, wherein the control unit is configured to:
  - obtain an output voltage of each of the DC-DC conversion units, obtain a reference voltage based on the output voltages of the DC-DC conversion units, compare the output voltages of the DC-DC conversion units with the reference voltage one after another to obtain voltage differences each corresponding to one of the output voltages of the DC-DC conversion units, and control an intermediate output level of the N-level conversion unit based on the voltage differences; or
  - obtain an output current of each of the DC-DC conversion units, obtain a reference current based on the output currents of the DC-DC conversion units, compare the output currents of the DC-DC conversion units with the reference current one after another to obtain current differences each corresponding to one of the output currents of the DC-DC conversion units, and control the intermediate output level of the N-level conversion unit based on the current differences;

wherein N and M are positive integers and satisfy N≥3 and 1≤M<N.

13. An electric device, comprising a charging apparatus comprising a voltage conversion circuit, the voltage conversion circuit comprising:
- an N-level conversion unit, comprising N output terminals at different levels; and
- N−1 DC-DC conversion units, wherein a first input terminal of an $M^{th}$ DC-DC conversion unit is connected to an $M^{th}$ output terminal of the N-level conversion unit, a second input terminal of the $M^{th}$ DC-DC conversion unit is connected to an $(M+1)^{th}$ output terminal of the N-level conversion unit, and an output level of the $M^{th}$ output terminal and an output level of the $(M+1)^{th}$ output terminal are adjacent levels; and
- a control unit connected to the N-level conversion unit and the N−1 DC-DC conversion units, wherein the control unit is configured to:
  - obtain an output voltage of each of the DC-DC conversion units, obtain a reference voltage based on the output voltages of the DC-DC conversion units, compare the output voltages of the DC-DC conversion units with the reference voltage one after another to obtain voltage differences each corresponding to one of the output voltages of the DC-DC conversion units, and control an intermediate output level of the N-level conversion unit based on the voltage differences; or
  - obtain an output current of each of the DC-DC conversion units, obtain a reference current based on the output currents of the DC-DC conversion units, compare the output currents of the DC-DC conversion units with the reference current one after another to obtain current differences each corresponding to one of the output currents of the DC-DC conversion units, and control the intermediate output level of the N-level conversion unit based on the current differences;

wherein N and M are positive integers and satisfy $N \geq 3$ and $1 \leq M < N$.

* * * * *